United States Patent
Multer et al.

(10) Patent No.: US 9,677,691 B2
(45) Date of Patent: Jun. 13, 2017

(54) SPRINKLER FITTING BRACKET

(71) Applicant: The Reliable Automatic Sprinkler Co., Inc., Liberty, SC (US)

(72) Inventors: Thomas Multer, Liberty, SC (US); John Tow, Liberty, SC (US); David Veisz, Liberty, SC (US); David Asplund, Liberty, SC (US); David Deurloo, Liberty, SC (US)

(73) Assignee: THE RELIABLE AUTOMATIC SPRINKLER COMPANY, Elmsford, NY (US)

( * ) Notice: Subject to any disclaimer, the term of this patent is extended or adjusted under 35 U.S.C. 154(b) by 0 days.

(21) Appl. No.: 14/264,913

(22) Filed: Apr. 29, 2014

(65) Prior Publication Data

US 2015/0075824 A1    Mar. 19, 2015

Related U.S. Application Data

(60) Provisional application No. 61/817,148, filed on Apr. 29, 2013.

(51) Int. Cl.
*A62C 35/68* (2006.01)
*A62C 13/76* (2006.01)
*B05B 15/06* (2006.01)
*F16L 3/00* (2006.01)

(52) U.S. Cl.
CPC ............... *F16L 3/00* (2013.01); *A62C 13/76* (2013.01); *A62C 35/68* (2013.01); *B05B 15/06* (2013.01); *B05B 15/065* (2013.01)

(58) Field of Classification Search
CPC ........ A62C 35/68; B05B 15/06; B05B 15/065
USPC ......... 169/51, 37, 41; 239/271–285; 248/75, 248/327, 300, 309, 312, 314, 342; 285/24, 26, 64
See application file for complete search history.

(56) References Cited

U.S. PATENT DOCUMENTS

| | | | |
|---|---|---|---|
| 4,418,757 A | 12/1983 | Merkel | |
| 4,834,186 A | 5/1989 | Ballard | |
| 4,880,063 A * | 11/1989 | Leininger | A62C 37/12 169/37 |
| 5,072,903 A | 12/1991 | Griffin | |
| 5,323,992 A | 6/1994 | Sifers et al. | |
| 5,385,320 A | 1/1995 | Ismert et al. | |
| 5,732,778 A * | 3/1998 | Tateno | A62C 37/11 169/37 |

(Continued)

*Primary Examiner* — Arthur O Hall
*Assistant Examiner* — Joseph A Greenlund
(74) *Attorney, Agent, or Firm* — Fitzpatrick, Cella, Harper & Scinto

(57) ABSTRACT

In one example embodiment, a bracket for a sprinkler fitting is provided having a first flange, a second flange connected to the first flange, and a mounting flange connected to at least one of the first and second flanges. The mounting flange may for example be substantially orthogonal to the first and second flanges. One of the first and second flanges has a preferably circular hole formed therethrough, and the other has a polygonal opening formed therethrough and aligned with the circular hole. An adapter having a polygonal end is inserted in the bracket such that the polygonal end aligns with the polygonal opening so as to limit rotation of the adapter with respect to the bracket, the adapter disposing a sprinkler coupled thereto with respect to a finished ceiling surface of a structure.

15 Claims, 15 Drawing Sheets

(56) References Cited

U.S. PATENT DOCUMENTS

| | | | |
|---|---|---|---|
| 5,740,994 A | 4/1998 | Laughlin | |
| 6,189,488 B1 | 2/2001 | Goldsher et al. | |
| 6,634,606 B2 | 10/2003 | Heath | |
| 6,755,379 B2* | 6/2004 | Kirschner | A62C 31/28 169/37 |
| 6,769,652 B1* | 8/2004 | Capan | B60T 17/046 248/65 |
| 7,017,868 B2* | 3/2006 | Kirschner | A61B 1/247 169/37 |
| 7,137,455 B2* | 11/2006 | Green | A62C 31/02 169/37 |
| 7,172,221 B1 | 2/2007 | Ferrara | |
| 7,264,214 B2* | 9/2007 | Oh | A62C 35/68 169/16 |
| 7,331,399 B2 | 2/2008 | Multer | |
| 7,353,882 B2* | 4/2008 | Pahila | A62C 37/14 169/16 |
| 7,455,268 B2 | 11/2008 | Heath | |
| 7,560,330 B2* | 7/2009 | Hwang | H01L 27/14601 257/E21.339 |
| 7,699,117 B2* | 4/2010 | Johnston | A62C 35/68 169/16 |
| 7,735,787 B2* | 6/2010 | Kafenshtok | E04B 9/001 169/37 |
| 7,878,464 B2* | 2/2011 | Oh | B05B 15/061 169/41 |
| 7,896,296 B2 | 3/2011 | Julian et al. | |
| 8,272,615 B2* | 9/2012 | Silcox | A62C 35/68 169/41 |
| 8,382,046 B2* | 2/2013 | Holland, Jr. | A01G 25/00 239/204 |
| 8,573,316 B2* | 11/2013 | Polan | A62C 35/58 169/37 |
| 8,833,719 B2* | 9/2014 | Lim | F16L 3/02 248/226.11 |
| 9,174,077 B2* | 11/2015 | Lim | A62C 35/68 |
| 2005/0139743 A1* | 6/2005 | Shim | E04B 9/006 248/342 |
| 2005/0263651 A1 | 12/2005 | Duponchelle | |
| 2006/0219818 A1* | 10/2006 | Franson | A62C 37/08 239/502 |
| 2006/0219819 A1* | 10/2006 | Franson | A62C 37/08 239/502 |
| 2008/0277125 A1* | 11/2008 | Wilkins | A62C 35/645 169/46 |
| 2009/0200433 A1 | 8/2009 | Hayes et al. | |
| 2010/0276922 A1* | 11/2010 | Rehder | F16L 37/0841 285/26 |
| 2011/0079301 A1* | 4/2011 | Karihara | F16K 15/03 137/511 |
| 2011/0094760 A1* | 4/2011 | Im | A62C 35/68 169/51 |
| 2011/0290508 A1* | 12/2011 | Hunsberger | A62C 35/68 169/51 |
| 2012/0090700 A1* | 4/2012 | Multer | A62C 35/68 137/357 |
| 2012/0090859 A1* | 4/2012 | Koiwa | A62C 37/11 169/41 |
| 2013/0020406 A1* | 1/2013 | Koiwa | A62C 37/14 239/209 |
| 2013/0133902 A1* | 5/2013 | Stimpson | A62C 35/68 169/51 |
| 2013/0306334 A1* | 11/2013 | Koiwa | A62C 35/00 169/51 |
| 2014/0360737 A1* | 12/2014 | Kim | F16L 3/00 169/51 |

* cited by examiner

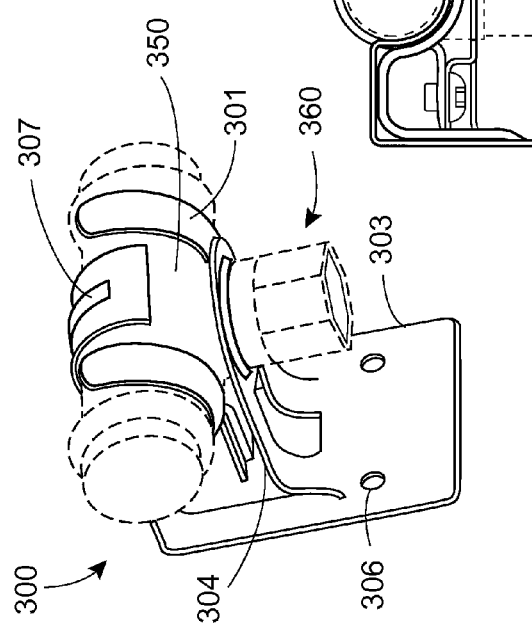
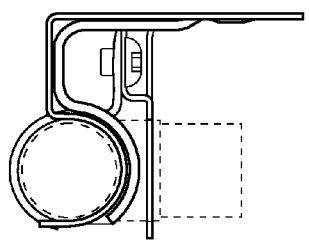
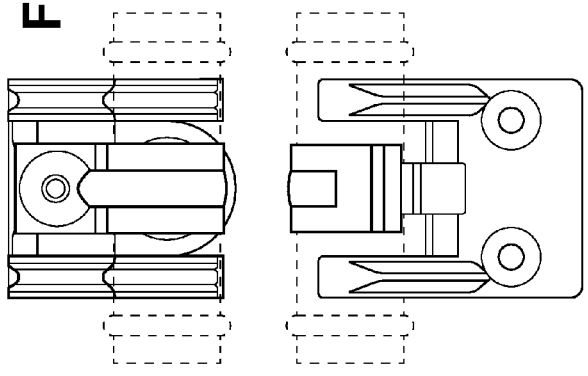
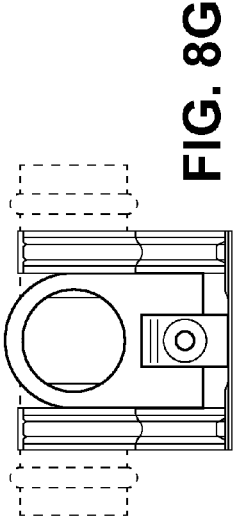
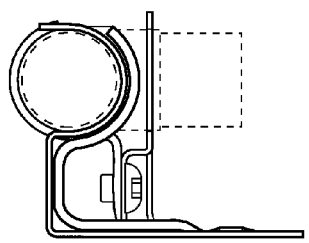
FIG. 8A  FIG. 8B  FIG. 8C  FIG. 8D  FIG. 8F  FIG. 8G

FIG. 10E FIG. 10G

FIG. 10D

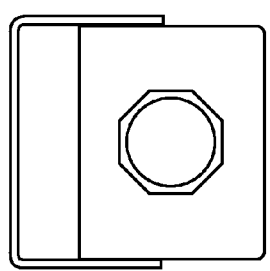

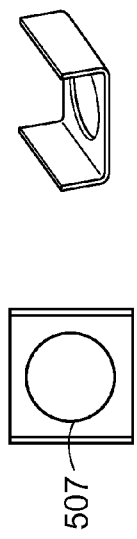
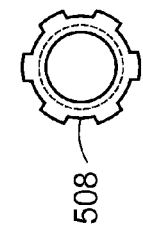
FIG. 11A  FIG. 11E  FIG. 11F
FIG. 11D  FIG. 11G  FIG. 11H
         FIG. 11I
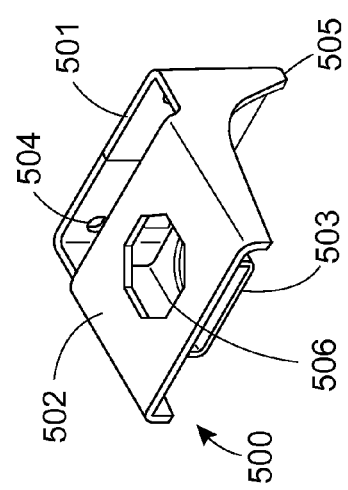
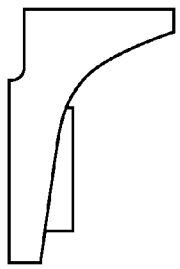
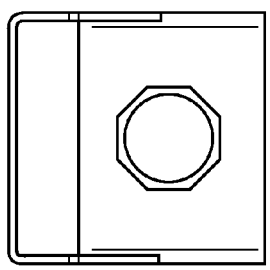
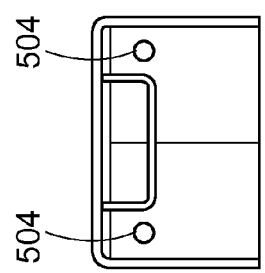
FIG. 11B  FIG. 11C

SPRINKLER FITTING BRACKET

RELATED APPLICATION

This application incorporates by reference the entire contents of provisional Application No. 61/817,148, filed Apr. 29, 2013, and claims benefit of the filing date of that provisional application under 35 U.S.C. §119(e).

BACKGROUND

Field

The following description relates to a mounting arrangement for fire sprinklers that employs at least one of a bracket and a fitting for use with the bracket, as well as a method of using the bracket to install such fittings. Specifically, in one aspect, the bracket attaches to a building structure to dispose a sprinkler coupled thereto with respect to a finished ceiling surface of the structure.

Description of Related Art

Fire sprinklers are often installed in ceilings of buildings. Typically, the sprinklers are connected to fittings and piping running in the ceiling. If the piping and fittings are not suitably located in the ceiling, the sprinklers that connect to the piping may not be positioned in the desired way with respect to the finished ceiling surface. For example, if the piping is located too high up in the ceiling, it is possible that a cover plate of a concealed sprinkler, for example, will not fit flush with the ceiling surface.

SUMMARY

To address the foregoing problems regarding positioning of sprinklers with respect to finished ceilings, in one example embodiment, a bracket for a sprinkler fitting includes a first flange, a second flange connected to the first flange, the first and second flanges being substantially parallel to each other. The bracket further includes a mounting flange connected to at least one of the first and second flanges, the mounting flange preferably being substantially orthogonal to the first and second flanges. One of the first and second flanges includes a preferably circular hole formed therethrough, and the other of those flanges includes a polygonal opening formed therethrough and aligned with the circular hole. An adapter having a polygonal end is inserted in the bracket such that the polygonal end aligns with the polygonal opening so as to limit rotation of the adapter with respect to the bracket, the adapter disposing a sprinkler coupled thereto with respect to a finished ceiling surface of a structure.

In another example embodiment, a bracket for a sprinkler fitting includes a mounting flange constructed to be fastened to a beam, and at least a pair of saddles extending from the mounting flange, each saddle constructed to support the sprinkler fitting. The bracket further includes a strap removably attached to the mounting flange and extending from the mounting flange between the saddles, the strap constructed to retain the sprinkler fitting between the strap and the saddles. In addition, the bracket includes a horizontal flange extending from the mounting flange, the horizontal flange having an opening to receive therethrough a portion of the fitting, the opening prevents the sprinkler fitting from rotating along an axis parallel to the beam.

BRIEF DESCRIPTION OF THE DRAWINGS

FIGS. 6, 7, 8 (FIGS. 8A-8D, 8F and 8G) and 9 (FIGS. 9A-9D, 9F and 9G) show views illustrating a bracket for disposing a tee fitting according to another example embodiment.

FIG. 11 (FIGS. 11A-11I) shows views illustrating a concealed sprinkler bracket according to yet another example embodiment.

Reference numerals that are the same but which appear in different figures represent the same elements, even if those elements are not described separately with respect to each figure.

DETAILED DESCRIPTION

Figure 1:
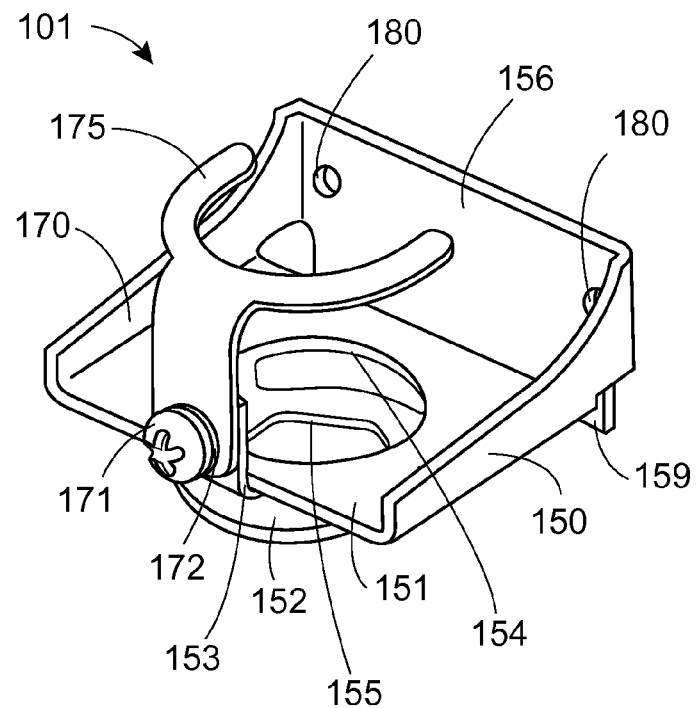
FIG. 1 is a view illustrating a bracket for a recessed sprinkler according to an example embodiment.
Figure 2:
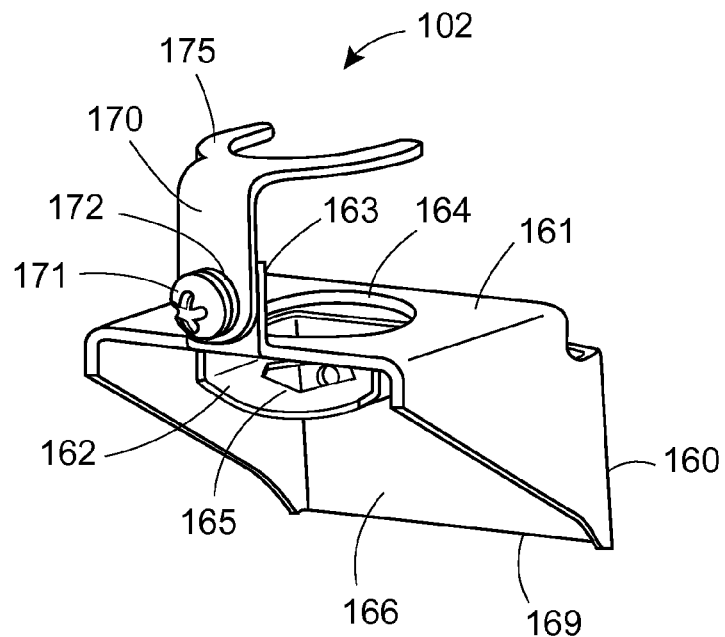
FIG. 2 is a view illustrating a bracket for a concealed sprinkler according to an example embodiment.

Certain embodiments may be used with CPVC (chlorinated polyvinyl chloride) piping. FIG. 1 shows a bracket for a recessed sprinkler (recessed bracket 101) and FIG. 2 shows a bracket for a concealed sprinkler (concealed bracket 102), both of which are constructed to retain a sprinkler fitting 110 while being mounted to a rafter/ceiling joist 120, as shown, for example, in FIGS. 3 and 4, according to an example embodiment. The recessed bracket 101 is constructed to dispose a recessed fire sprinkler 130, while the concealed bracket 102 is constructed to dispose a concealed cover fire sprinkler 140. The recessed bracket 101 and the concealed bracket 102 are generally constructed as a two piece structure including a base (150, 160) and a hold down bracket 170. The respective bases and hold down brackets for the two types of brackets are specifically adapted for their respective types of sprinklers. The hold-down bracket 170 is removably attached to the base (150, 160) with a screw 171 and a lock washer 172. The hold-down bracket 170 is formed in what might be termed a "bent wishbone" shape—having arms extending generally in one plane to embrace or support a sprinkler or fitting, and having a support portion extending in a different plane.

The bases of the recessed and concealed brackets are similarly constructed in that they both have a first, upper flange (151, 161) which has a tab (153, 163) for connection to the hold down bracket 170 (the use of the relative terms "upper", "lower", "down" and the like is for the sake of brevity and convenience, and refers to what is upper or lower when the bracket is oriented as shown in the Figures). A preferably circular hole (154, 164) is formed in the first flange (151, 161). The circular hole (154, 164) aligns with an upper u-shaped portion 175 of the hold down bracket 170. The base (150, 160) also includes a second, lower flange (152, 162) below the first flange (151, 161). A non-circular opening—in this embodiment, a hexagonal opening (155, 165)—is formed in the second flange (152, 162) in alignment with the circular hole (154, 164) formed in the first flange (151, 161) and the u-shaped portion 175 of the hold-down bracket 170. The base (150, 160) also includes a bracket mounting flange (156, 166) connected to the first and second flanges. The mounting flange (156, 166) is generally orthogonal to the first and second flanges. Apertures 180 are formed in the mounting flange (156, 166) through which fasteners (not shown) can pass for attaching the bracket to the structure of a building, such as a rafter/floor joist.

The dimensions of the hold down brackets can vary based on the nominal size fitting (e.g., CPVC adapter) to be retained by the bracket. The hold down bracket retains the fitting in the bracket and limits vertical movement of the fitting with respect to the bracket. In one example embodiment, the hold down bracket and base are constructed to accommodate a 1" CPVC to ½" NPT (National Pipe Tapered Thread) adapter and a ¾" CPVC to ½" NPT adapter. Thus, the concealed bracket and the recessed bracket can be used with either of such two adapters, allowing for four possible bracket-adapter assembly combinations. Of course, the foregoing examples are not limiting, and, in other example embodiments, the hold down bracket and base can be constructed to accommodate adapters of different sizes.

Figure 3:
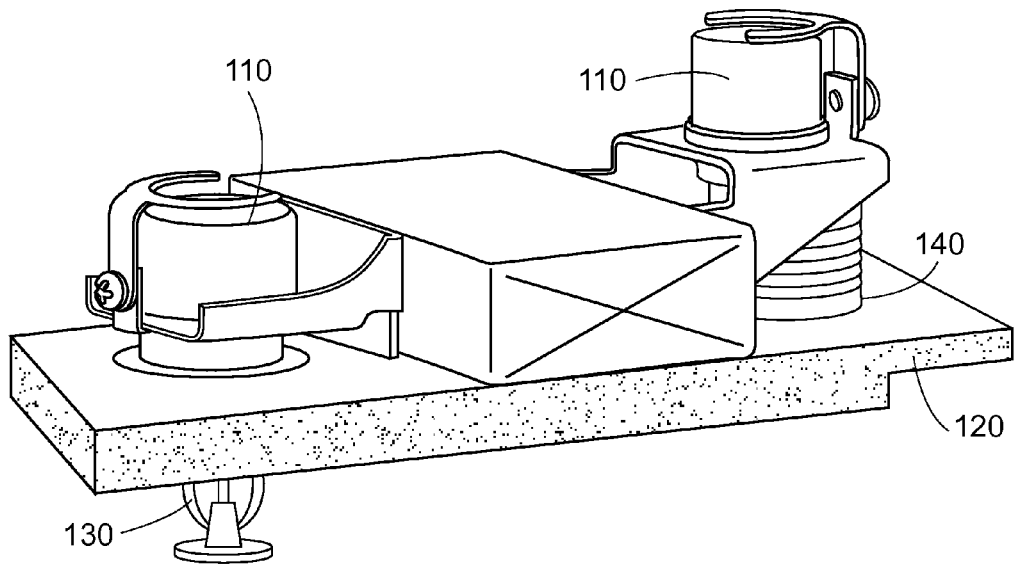
FIGS. 3 and 4 show views of the recessed bracket and the concealed bracket as shown respectively in FIGS. 1 and 2, being mounted to a rafter/ceiling joist according to an example embodiment.
Figure 4:
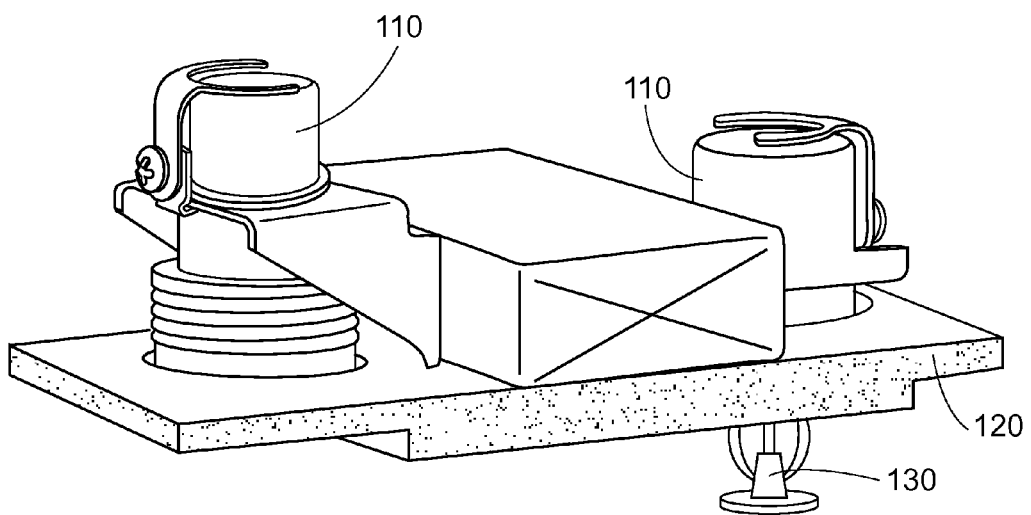
Figure 19:
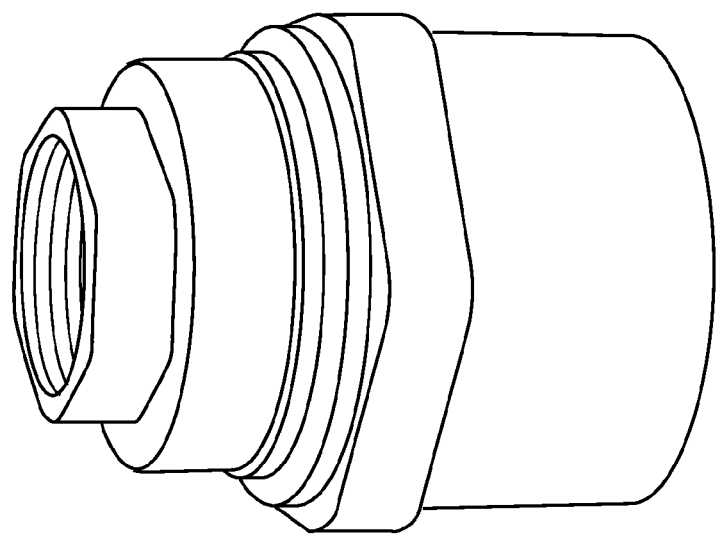
FIG. 19 shows examples of an adapter.
Figure 19:
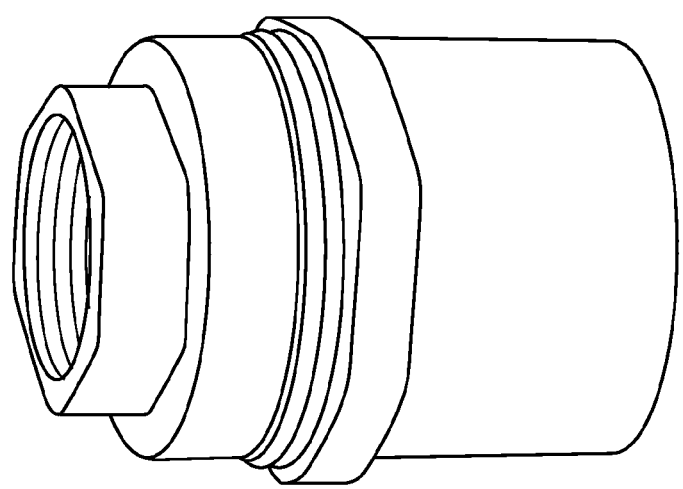
Figure 20:
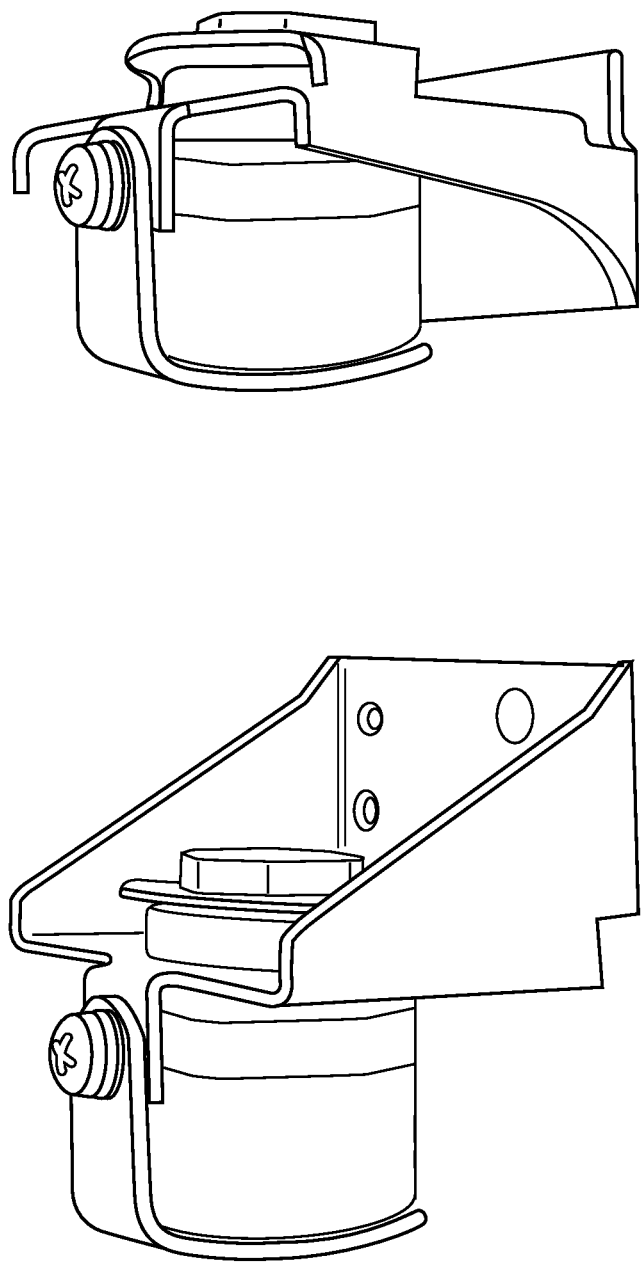
FIGS. 20 and 21 show views of the recessed bracket and the concealed bracket as shown respectively in FIGS. 1 and 2, in which the brackets retain an adapter according to one example embodiment.
Figure 21:
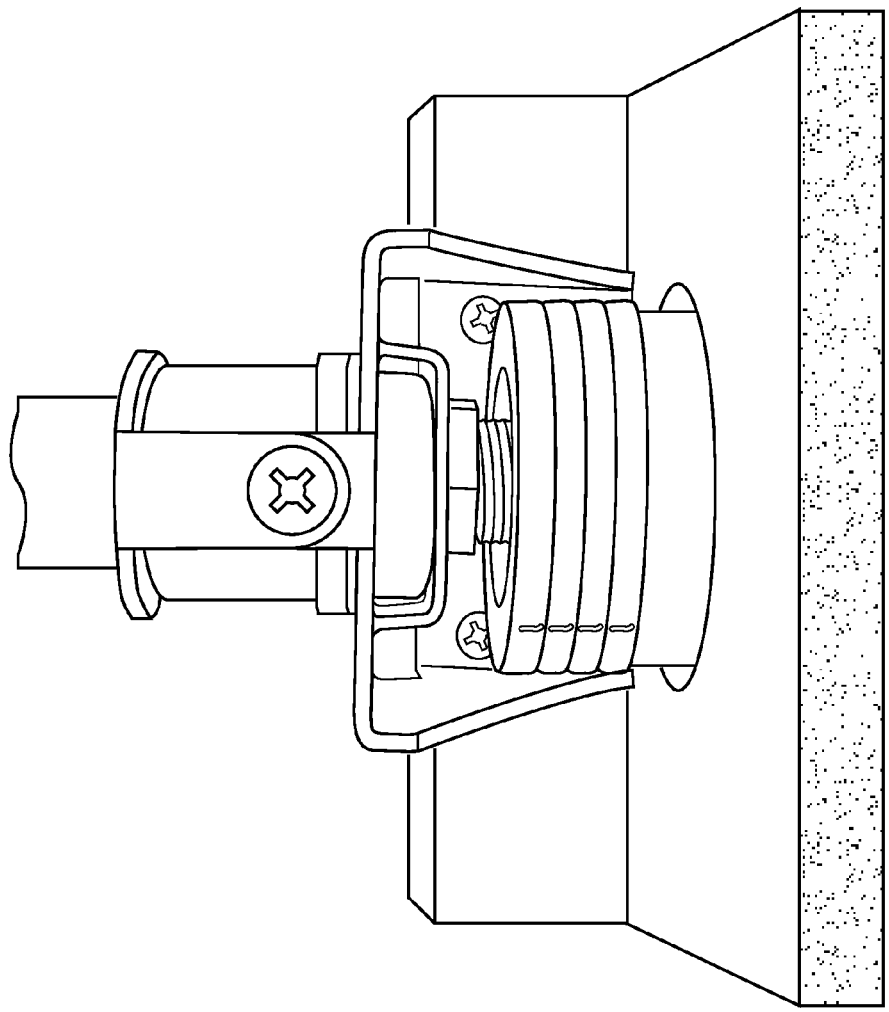

As shown in FIGS. 3, 4, 20 and 21, the brackets retain an adapter between the hold down bracket 170 and the second flange (152, 162). In one example embodiment, the adapters are CPVC to NPT adapters. Further, in this example embodiment, the CPVC to NPT adapters can be fittings manufactured, for example, by Spears® Manufacturing under the trade name TorqueSafe™, as shown, for example, in FIG. 19. The brackets are also constructed to accommodate standard fittings that are formed with an external hexagonal shape around the NPT threaded end of the adapter. The hex shape of the TorqueSafe™ or standard adapters aligns within the hex opening in the second flange (152, 162) of the base (150, 160) so as to limit rotation of the adapter with respect to the bracket, such as when a sprinkler, as shown, for example, in FIGS. 3 and 4, is threaded into the NPT threaded end of the adapter.

The adapters can be inserted into the bracket (e.g., bracket 101 or 102) as follows. The screw 171 between the hold down bracket 170 and the base (150, 160) can be loosened to allow the bracket to rotate or the screw 171 can be removed completely to separate the hold down bracket 170. In either case, the u-shaped portion 175 of the hold down bracket 170 is moved so as to provide clearance sufficient to introduce the NPT threaded end of the adapter down towards the second flange (152, 162) of the base (150, 160). As the adapter is positioned lower into the base (150, 160), the adapter hex portion is aligned in the hexagonal opening (155, 165) of the second flange (152, 162) of the base (150, 160) and a seating flange above the hex portion of the adapter seats above the rim of the circular opening (154, 164) in the first flange (151, 161) of the base (150, 160). Once the adapter is seated, the hold down bracket 170 is positioned such that the u-shaped portion 175 extends above the upper edge of the adapter. Once the bracket is so positioned, the screw 171 is tightened, thereby retaining the adapter vertically between the hold down bracket 170 and the first flange (151, 161) and rotationally by the hexagonal opening (155, 165) of the second flange (152, 162). Of course, one of ordinary skill in the art will appreciate that other steps may be used to retain the adapter in the bracket or additional steps can be taken to assemble a sprinkler to the adapter as an assembly before introducing the adapter into the bracket.

The brackets (e.g., bracket 101 and/or 102) can be installed in a building having wooden rafter/floor joists 120, as shown, for example, in FIGS. 3 and 4. A bottom edge (159, 169) of the mounting flange (156, 166) of each bracket aligns with a lower edge of the rafter/floor joist 120 and is attached to the rafter/floor joist with screws through the apertures 180 in the mounting flange (156, 166). The brackets are constructed so that at the time of installation they can be installed alone, or with an adapter fitting already retained in the bracket, or as an assembly including the bracket, fitting and a sprinkler.

As shown in FIGS. 3 and 4, the first flange (151, 161) extends from the mounting flange (156, 166) at a predetermined vertical distance x measured from the bottom edge (159, 169) of the mounting flange (156, 166), and aligns with the lower edge of the rafter/joist 120. The distance x is based on the construction and dimensions of the sprinkler (e.g., sprinklers 130) to be used with each bracket and the range of the dimensions of the thickness of the ceiling. For example, for the concealed sprinkler 140 shown in FIGS. 3 and 4, the sprinkler has a mounting cup which adjustably receives a skirt. The skirt is attached to a cover that conceals the sprinkler. The skirt and cup are formed such that the skirt has a range of vertical adjustment with respect to the cup to accommodate variations in ceiling thickness. As shown in FIGS. 3 and 4, the concealed bracket 102, and more specifically the first flange 161 of the base 160, fixes the position of the adapter 110, and therefore the position of the cup of the concealed sprinkler 140 with respect to the lower edge of the joist 120 and the upper surface of the ceiling (e.g., drywall). Thus, the cup is positioned such that the skirt can be adjusted to be flush with the lower surface of the ceiling for a range of ceiling thicknesses.

The recessed sprinkler 130 as shown, for example, in FIGS. 3 and 4 includes an adjustable escutcheon that is vertically adjustable with respect to the sprinkler. An annular rim of the escutcheon is constructed to seat against the lower ceiling surface. The first flange 151 of the base 150 of the recessed bracket 101 disposes the adapter 110 and the recessed sprinkler 130 such that the escutcheon of the recessed sprinkler 130 can be adjusted for a range of ceiling thicknesses.

The adapter fittings retained in the brackets support rigid CPVC piping and properly position and retain the adapter such that either a recessed or concealed sprinkler can be connected to the fitting and an escutcheon of the sprinkler can be adjusted according to the sprinkler installation instructions. As discussed above in connection with FIGS. 1 and 2, each bracket includes a hexagonal opening (155, 165) fabricated into the second flange (152, 162) to prevent the adapter fitting (e.g., adapter 110) from rotating as the sprinkler is either installed in or removed from the NPT side of the adapter fitting. The hexagonal opening arrangement is intended to hold the adapter fitting in place allowing for sprinkler installation and removal while not applying a load to the CPVC fitting, as such a load can cause a failure in the fitting itself. The concealed and recessed brackets can be formed of various materials including, for example, metal, plastic, and composites. In one example embodiment, the bracket is formed of steel.

Certain embodiments may be used with PEX (cross-linked polyethylene) piping. In another example embodiment, a bracket 300, as shown, for example, in FIGS. 6 to 9, can be used to dispose a tee fitting and/or a fire sprinkler (not shown), like that described above in connection with FIGS. 1 to 4, in sprinkler systems using flexible plumbing (e.g., PEX (cross-linked polyethylene) tubing) that are installed in buildings constructed with wood I-joists, such as that shown in FIG. 5.

Wood I-Joists (e.g., wood I-joist 200) are used in residential construction and typically consist of lower (201) and upper (202) 2" (1½" actual)×3" (2½" actual) flanges (otherwise termed "chords") connected by thin Oriented Strand Board (OSB) 203. The bracket is constructed to align with and attach to a vertical face 204 (e.g., 1½" high) of the lower chord 201 to mitigate variances in installers locating sprinkler fittings in the sprinkler system. A lower edge of the bracket is arranged to align with a bottom edge 205 of the lower chord 201 so as to provide a predetermined vertical adjustment of a sprinkler fitting/sprinkler assembly (concealed or recessed) with respect to the finished (e.g., lower) surface of a ceiling that is to be attached to the lower chord of the joist.

In one example embodiment, the bracket retains a tee fitting, for example, a fitting sold under the trademark PureFlow® PEX Pro-Press Tee, manufactured by Viega®. In this example embodiment, the tee fitting has a body with two ¾ inch ports for connection to PEX tubing and a third ½ inch NPT threaded port for connection to a fire sprinkler. In another example embodiment, the tee fitting has a body with two 1 inch ports for connection to PEX tubing and a third ½ NPT threaded port for connection to a fire sprinkler.

FIGS. 6 to 9 depict the bracket 300 comprising two supportive u-shaped saddles 301 and a horizontal flange 302 extending between the two saddles. The two saddles 301 and the flange 302 extend from a mounting portion 303 of the bracket. A circular opening 304 is formed in the flange 302 that is sized to permit the passage of a third port 360 of the fitting 350, as shown, for example, in FIG. 8. The mounting portion 303 has a vertical surface having two holes 306 formed therein through which screws (not shown) can pass for attaching the bracket to the lower chord of the I-joist. The bracket also includes a u-shaped strap 307 that is removably attached to the mounting portion 303 with a screw 308. Two symmetrical ports 370 of the fitting 350 are supported by the saddles 301 with the third port 360 vertically aligned by the horizontal flange 302 in a direction that is generally parallel with the vertical surface of the mounting portion 303 of the bracket 300. The horizontal flange 302 prevents the fitting 350 from accidently rotating with respect to the vertical surface of the mounting portion 303 once drywall, for example, is attached to the ceiling joists. Various views are shown individually in FIGS. 9A-9G.

To prevent vertical lift of the sprinkler fitting, the strap 307 is lowered over the fitting 350. Although the strap 307 is shown as being removably connected to the bracket with a screw, in other example embodiments, the strap can be crimped or spot welded to the bracket in the factory. It should be noted that a fully assembled bracket/fitting assembly should be rigid enough to prevent excessive twisting of the retained fitting under the influence of screw-in torque generated during a final phase of sprinkler attachment in the field.

During installation of the bracket 300 or bracket/fitting assembly, a lower edge 310 of the mounting portion 303 of the bracket is aligned with a bottom edge of the lower chord of the I-beam and the bracket is screwed to the I-joist (e.g., I-joist 200) using the holes 306 in the mounting surface. Thus, when attached to the I-joist, the saddles 301 dispose the third port of the fitting at a predetermined distance with respect to the bottom edge of the I-joist and therefore with respect to the finished surface of the ceiling attached to the I-joist. The saddles are dimensioned so that a fire sprinkler, such as the concealed and recessed sprinklers shown in FIGS. 3 and 4, can be attached to the fitting in the bracket while providing sufficient adjustability of any escutcheon and cover for the expected range of ceiling thickness.

In addition to the noted alignment of the bracket to the I-joist, the foregoing arrangement can provide the advantageous effect of ease and expedited field assembly of the new generation of sprinkler piping system(s) which consist of flexible plastic tubing, ends of which are slipped onto and then crimped to specially engineered fittings (e.g., tees and/or elbows). The arrangement can be adapted for usage with glued CPVC tubing and fittings as well. In one aspect, the bracket can be assembled together with a fitting as an assembly that can be later attached to the lower chord with two screws.

In yet another example embodiment, a recessed sprinkler bracket 400, as shown, for example, in FIG. 10, includes a mounting flange 401, a first flange 402 and a second flange 403. The mounting flange 401 extends generally vertically upward from the first flange 402 and includes two holes 404 for attaching the mounting flange 401 to the I-joist (e.g., I-joist 200). A lower edge 405 of the mounting flange 401 is arranged to align with the bottom edge (e.g., bottom edge 205) of the lower chord 201 of the I-joist. The first flange 402 and second flange 403 extend generally perpendicular to the mounting flange 401. The first flange 402 has an octagonal opening 406 therethrough and the second flange 403 has a circular opening 407 formed therethrough. The first and second flanges are spaced apart a predetermined distance to accommodate a portion of a fitting to be positioned therebetween. One example of a fitting that can be used with the bracket shown in FIG. 10 is a PEX Press Zero Lead NPT adapter manufactured by Viega®. Such an adapter has an NPT end that has an outer surface that is generally octagonal to be received in the octagonal opening 406 of the first flange 402. The octagonal opening 406 in the first flange 402 is aligned with the circular opening 407 in the second flange 403. When assembled, the octagonal end of the NPT adapter is inserted through the octagonal opening 406 of the first flange 402 and an end of the fitting rests around the circular opening 407 of the second flange 403. In this position, the octagonal opening 406 of the first flange 402 surrounds and aligns with the octagonal surface of the adapter to prevent the adapter from rotating. The adapter becomes further limited in vertical motion when the threaded end of the sprinkler is inserted through the circular opening 406 of the second flange 403 into the end of the adapter fitting. A locknut 408 may be threaded onto the threads of the sprinkler before the sprinkler is threaded to the adapter fitting.

In an additional example embodiment, a concealed sprinkler bracket 500, as shown, for example, in FIG. 11, includes a mounting flange 501, a first flange 502 and a second flange 503. The mounting flange 501 extends generally vertically downward from the first flange 502 and includes two holes 504 for attaching the mounting flange 501 to the I-joist (e.g., I-joist 200). A lower edge 505 of the mounting flange 501 is arranged to align with the bottom edge 205 of the lower chord 201 of the I-joist. The first flange 502 and second flange 503 extend generally perpendicular to the mounting flange 501. The first flange 502 has an octagonal opening 506 therethrough and the second flange 503 has a circular opening 507 formed therethrough. The first and second flanges are spaced apart a predetermined distance to accommodate a portion of a fitting to be positioned therebetween. One example of a fitting that can be used with the bracket shown in FIG. 11 is a PEX Press Zero Lead NPT adapter manufactured by Viega®. Such an adapter has an NPT end that has an outer surface that is generally octagonal to be received in the octagonal opening 506 of the first flange 502. The octagonal opening 506 in the first flange 502 is aligned with the circular opening 507 in the second flange 503. When assembled, the octagonal end of the NPT adapter is inserted through the octagonal opening 506 of the first flange 502 and an end of the fitting rests around the circular opening 507 of the second flange 503. In this position, the octagonal opening 506 of the first flange 502 surrounds and aligns with the octagonal surface of the adapter to prevent the adapter from rotating. The adapter becomes further limited in vertical motion when the threaded end of the sprinkler is inserted through the circular opening 507 of the second flange 503 into the end of the adapter fitting. A locknut 508 may be threaded onto the threads of the sprinkler before the sprinkler is threaded to the adapter fitting.

Figure 5:
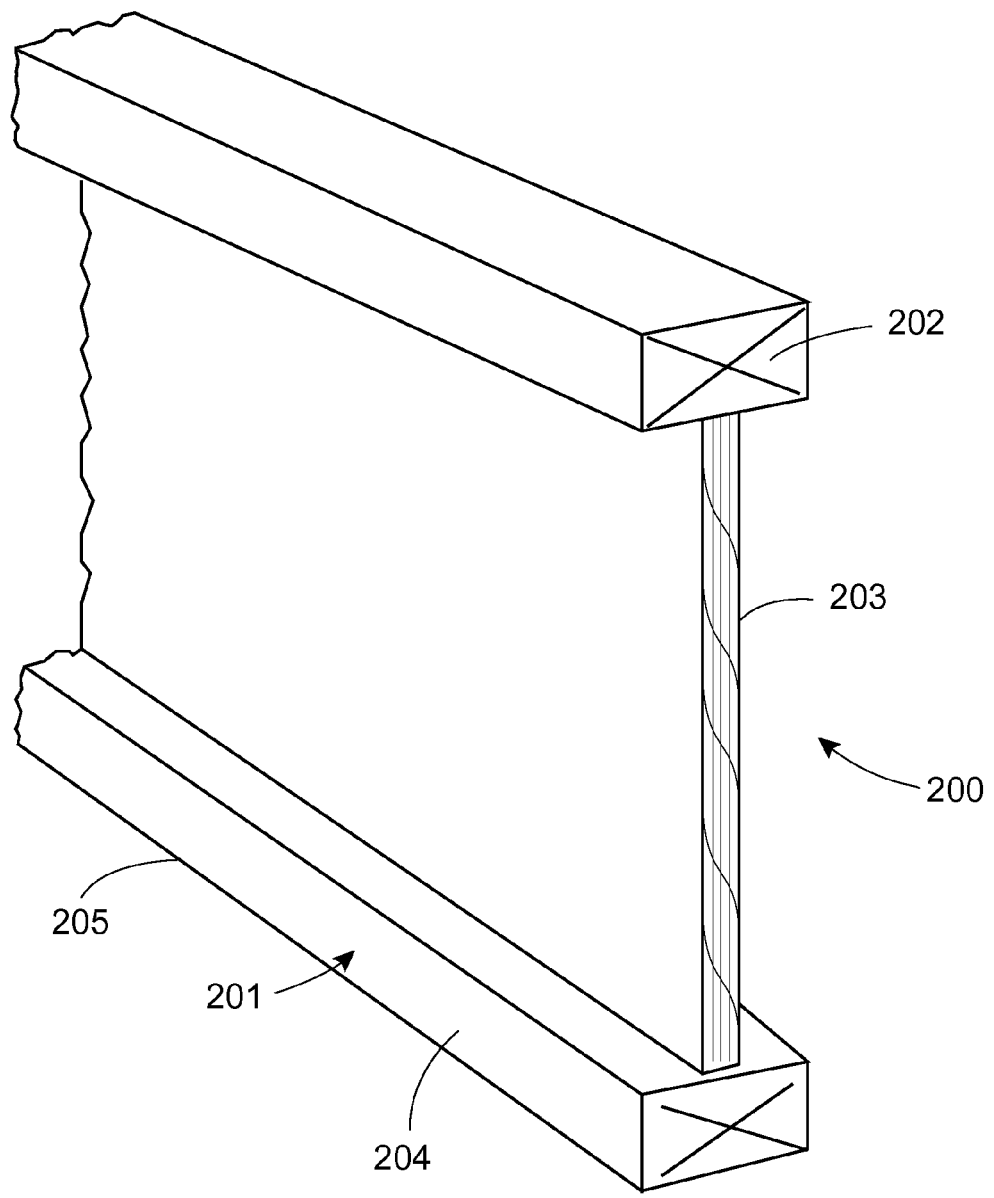
FIG. 5 shows a wood I-joist.
Figure 6:
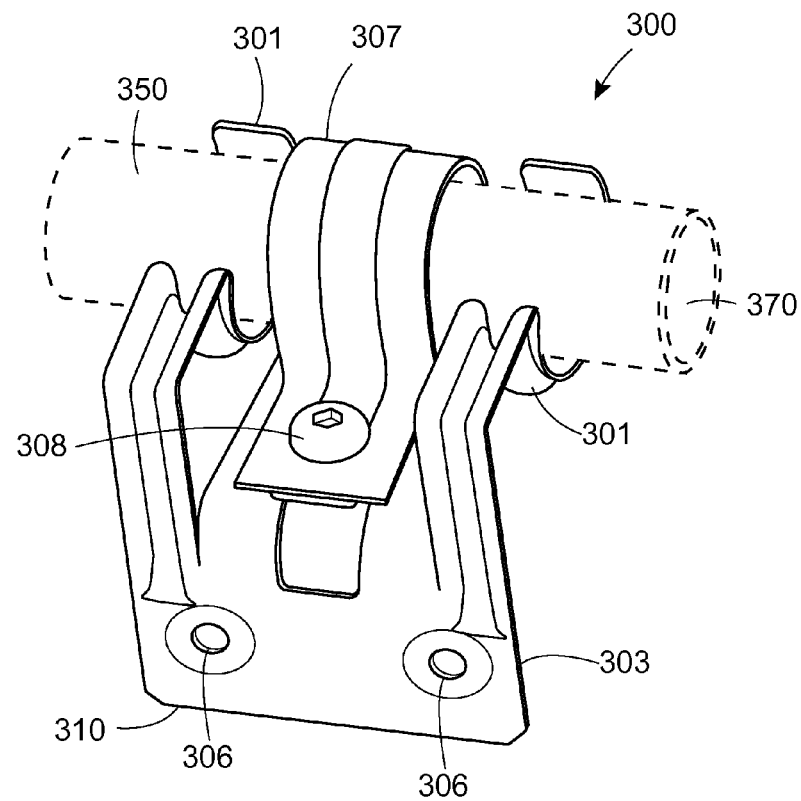
Figure 7:
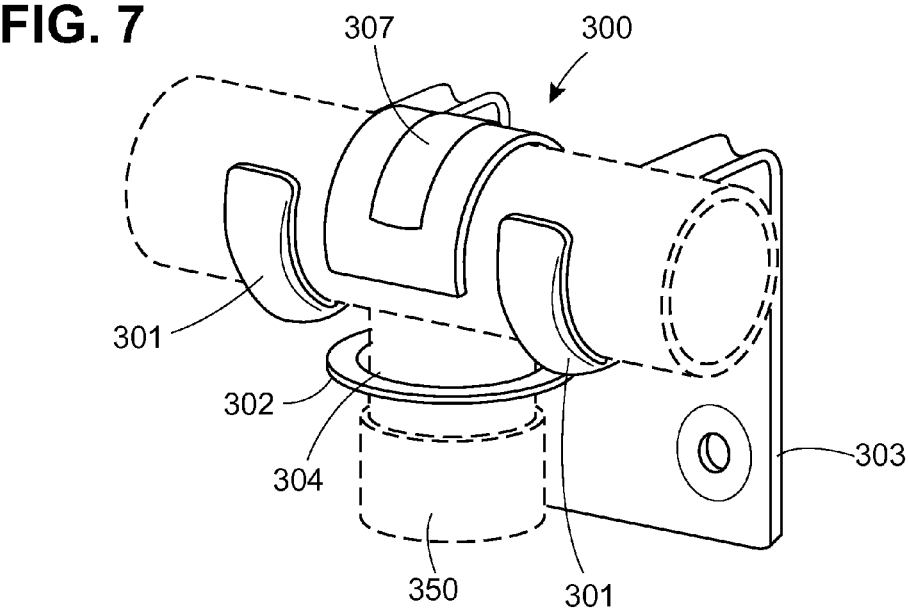
Figure 9F:
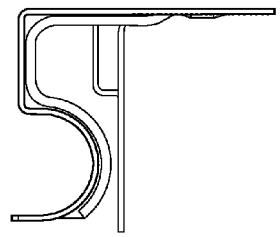
Figures 9B, 9D, 9G:
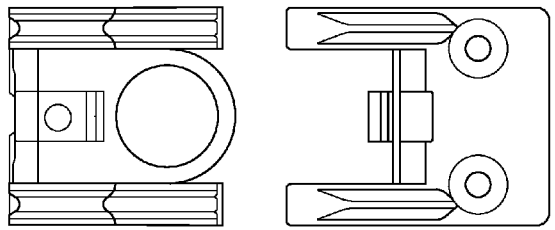
Figure 9C:
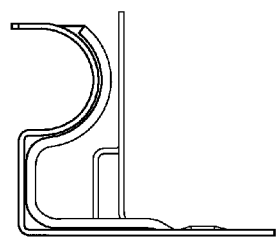
Figure 9A:
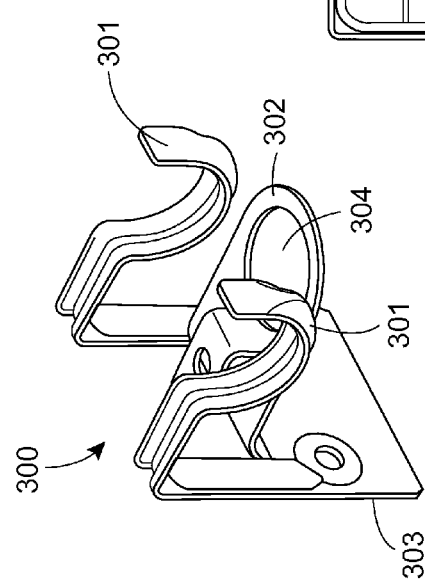
Figure 10F:
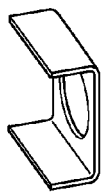
FIG. 10 (FIGS. 10A-10I) shows views illustrating a recessed sprinkler bracket according to an additional example embodiment.
Figure 10H:
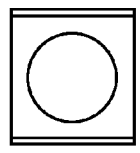
Figure 10I:
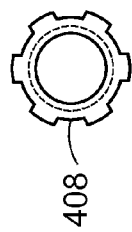
Figure 10A:
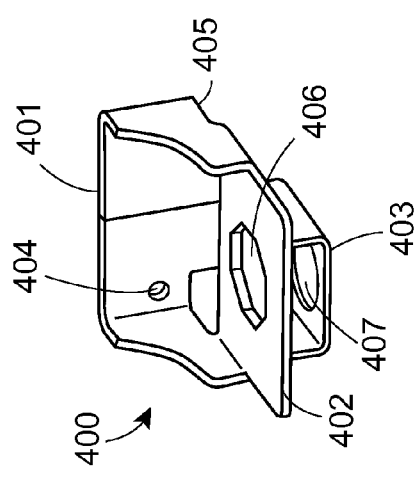
Figure 10B:
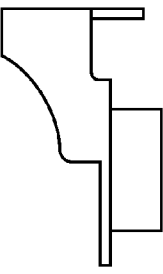
Figure 10C:
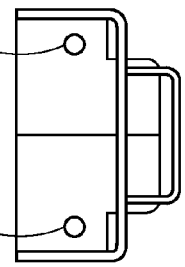
Figure 12:
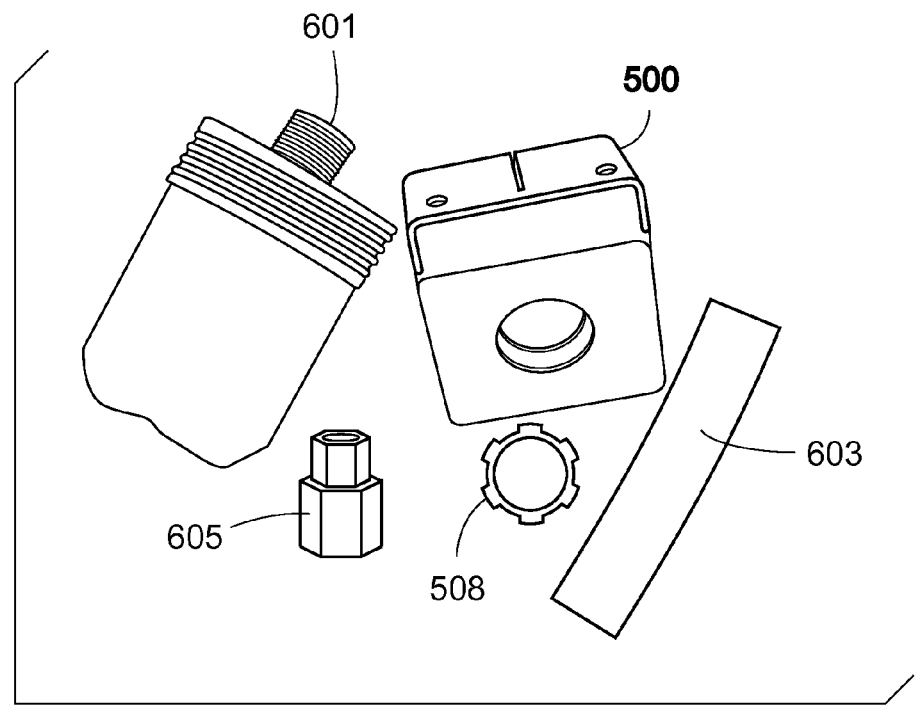
FIGS. 12 to 18 show views for describing an installation procedure for installing a concealed sprinkler in combination with a concealed sprinkler bracket, according to one example embodiment.
Figure 13:
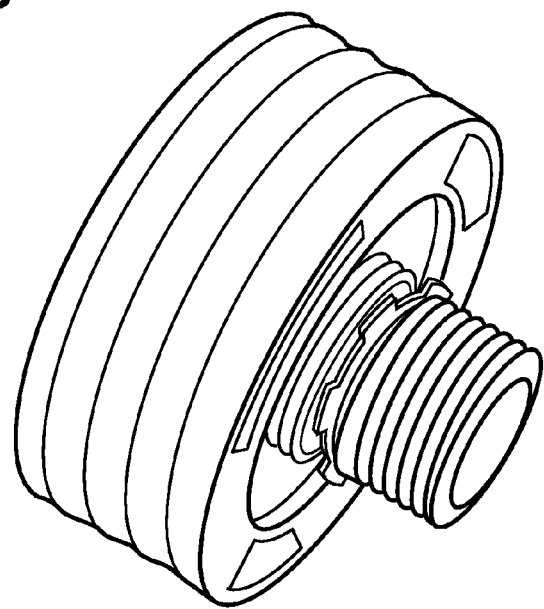
Figure 14:
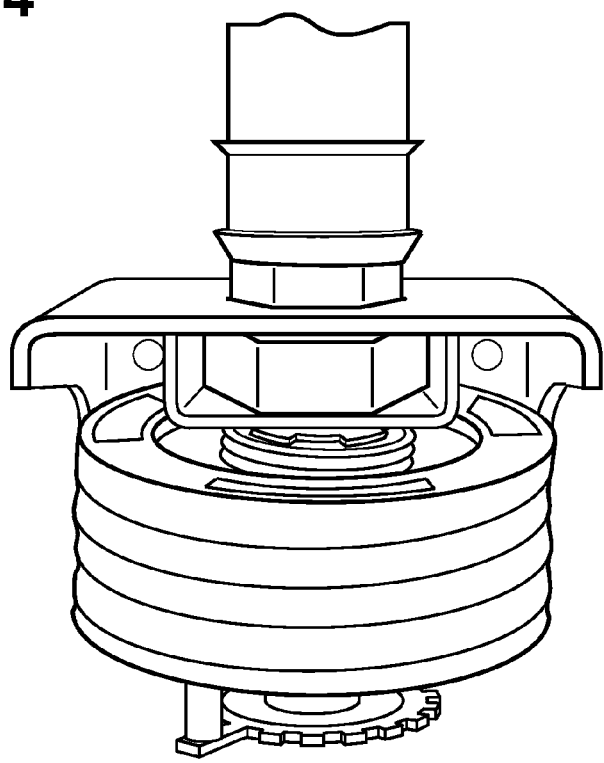
Figure 15:
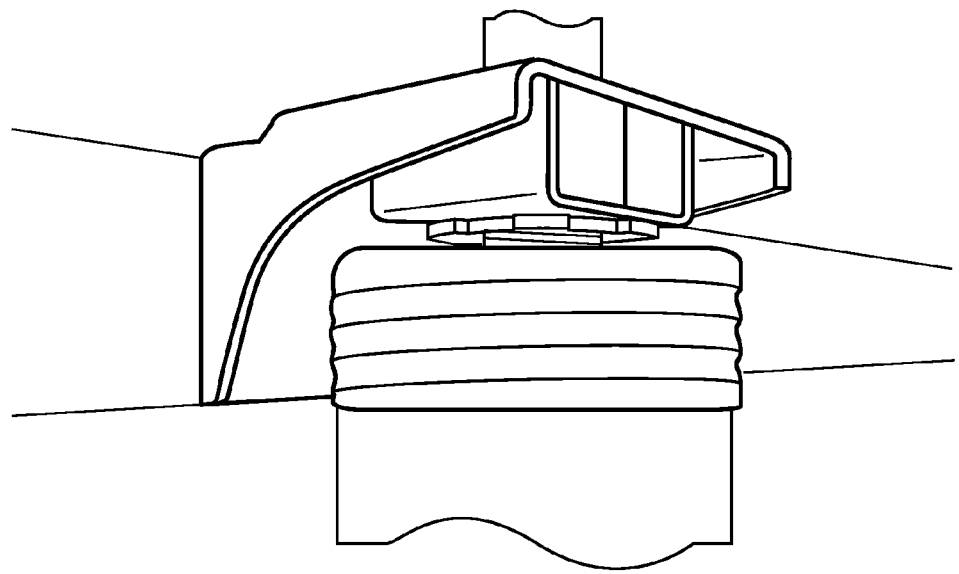
Figure 16:
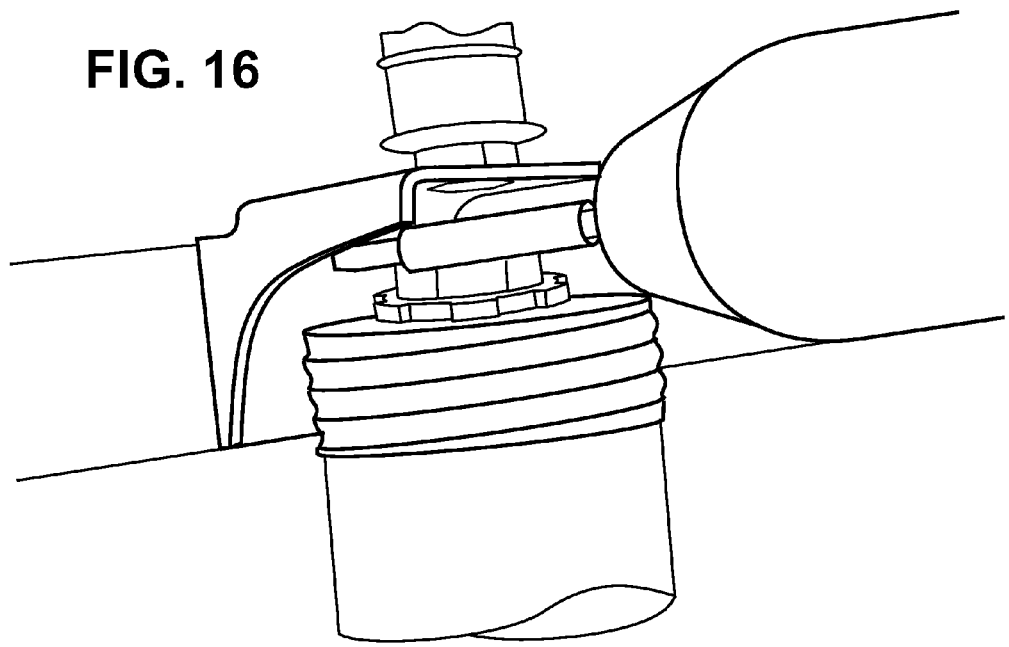
Figure 17:
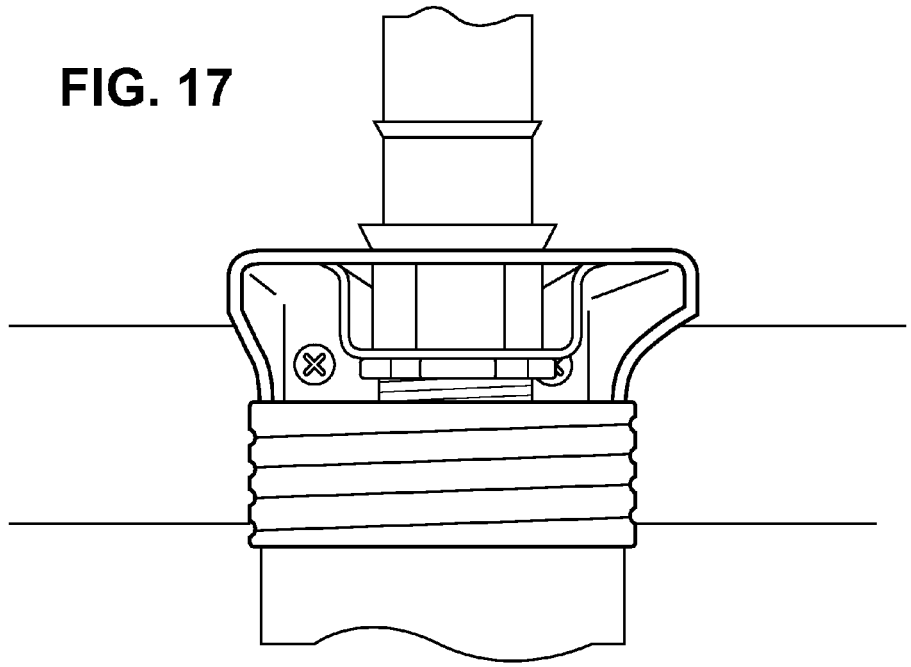
Figure 18:
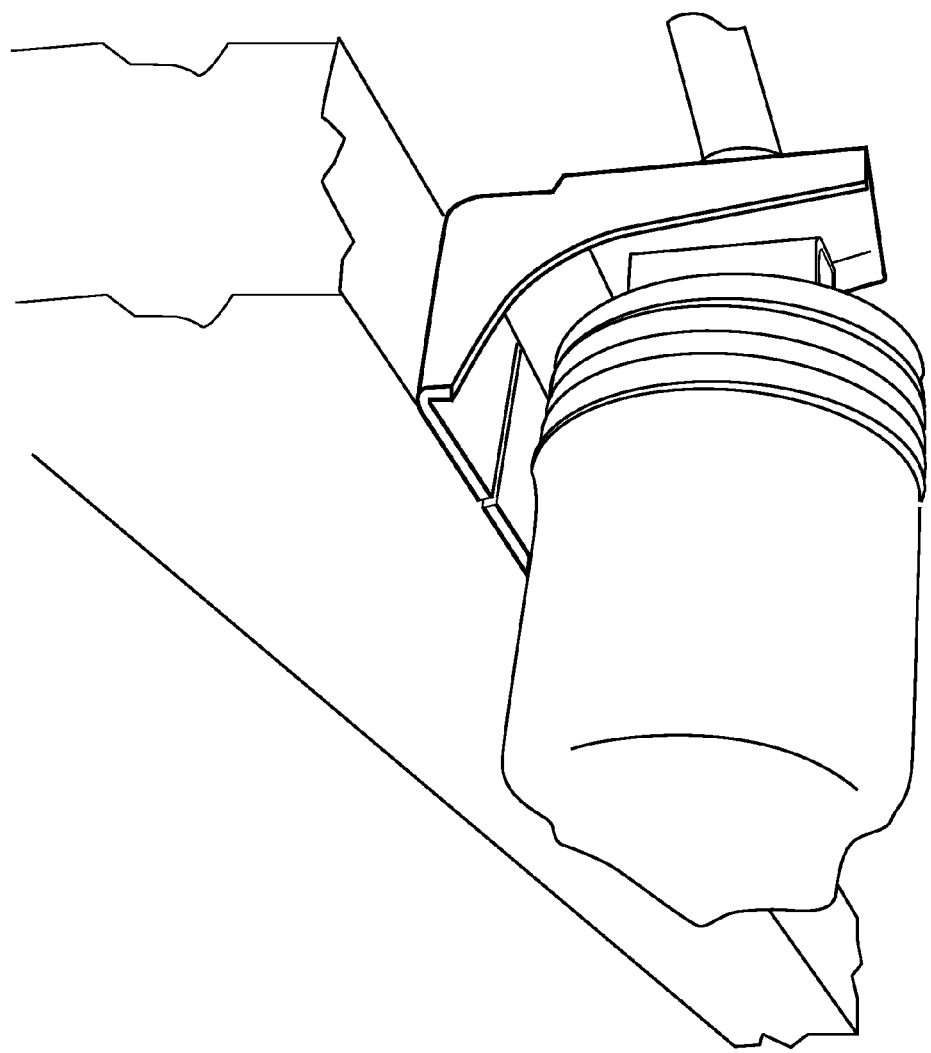

The following is a description of one example of an installation procedure for assembling a concealed sprinkler 601 (FIG. 12) to a concealed sprinkler bracket (e.g., bracket 500 of FIG. 11) and mounting the bracket to an I-joist (e.g., I-joist 200 of FIG. 5). First, the sprinkler is bench assembled to the bracket. As shown in FIG. 13, a lock nut (e.g., 508) is threaded onto the sprinkler finger tight flush to a sprinkler cup 601 and PTFE (Polytetrafluoroethylene) tape applied to the threads. An adapter fitting 605 is introduced through the octagonal opening in the first flange, and while holding the bracket and fitting in place, the sprinkler is threaded into the fitting and tightened, as shown, for example, in FIG. 14. The lock nut is adjusted until it is flush with the second flange of the bracket. The adjustment of the lock nut is used to eliminate any vertical movement after the sprinkler has been properly installed into the NTP port. Thereafter, PEX tubing 603 can optionally be connected to the adapter before mounting the bracket to the I-joist, as shown, for example, in FIG. 14. As shown in FIG. 15, the lower edge of the mounting flange of the bracket is aligned with the bottom edge of the lower chord of the I-joist. As shown in FIG. 16, the bracket is attached with screws to the lower chord of the I-joist through the holes in the mounting flange of the bracket, leaving a mounted bracket/sprinkler assembly shown in FIG. 17. If the protective sprinkler cover was removed during the prior steps, the cover can be replaced as shown, for example, in FIG. 18.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

Further, the purpose of the accompanying Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure provided herein. The Abstract is not intended to be limiting as to the scope of the example embodiments presented herein in any way.

What is claimed is:
1. A bracket for a sprinkler fitting, comprising:
a first flange;
a second flange connected to the first flange, the first and second flanges being substantially parallel to each other;
a mounting flange connected to at least one of the first and second flanges; and
a hold-down bracket for retaining an adapter of the sprinkler fitting, the hold-down bracket being removably attached to the first flange,
wherein one of the first and second flanges comprises a first hole formed therethrough, and the other one of the first and second flanges comprises a polygonal opening formed therethrough and aligned with the first hole, the polygonal opening being non-circular, and aligning with a polygonal end of an adapter of the sprinkler fitting inserted in the bracket, such that rotation and vertical movement of the adapter is limited with respect to the bracket upon engagement of the polygonal opening with the adapter and attachment of the hold-down bracket, the adapter disposing a sprinkler coupled thereto with respect to a finished ceiling surface of a structure,
wherein the first flange and the second flange are both configured to receive and contact the sprinkler fitting.
2. A bracket according to claim 1, wherein the first hole is circular.
3. A bracket according to claim 1, wherein the first flange has a tab, and the hold-down bracket is removably attached to the tab of the first flange.
4. The bracket according to claim 3, wherein the hold-down bracket is formed in a bent wishbone shape, and an upper u-shaped portion of the hold-down bracket is aligned with the first hole.
5. A bracket according to claim 1, wherein the polygonal opening is hexagonal or octagonal.
6. A bracket according to claim 1, wherein the mounting flange extends generally perpendicular to the first flange, and extends in a direction away from the second flange.
7. A bracket according to claim 1, wherein the mounting flange extends generally perpendicular to the first flange, and extends in a direction toward the second flange.
8. A bracket according to claim 1, wherein the mounting flange comprises at least two holes for attaching the mounting flange to an I-joist of the structure.
9. A bracket according to claim 1, wherein the first flange extends from the mounting flange at a predetermined vertical distance measured from a bottom edge of a mounting flange, and is to align with a lower edge of a rafter/joist.
10. In combination, a bracket and a sprinkler fitting, the bracket comprising:
a first flange;
a second flange connected to the first flange, the first and second flanges being substantially parallel to each other;
a mounting flange connected to at least one of the first and second flanges; and
a hold-down bracket for retaining an adapter of the sprinkler fitting, the hold-down bracket being removably attached to the first flange,
wherein one of the first and second flanges comprises a first hole formed therethrough, and the other one of the first and second flanges comprises a polygonal opening formed therethrough and aligned with the first hole, the polygonal opening being non-circular, and aligning with a polygonal end of the sprinkler fitting inserted in the bracket, such that rotation and vertical movement of the fitting is limited with respect to the bracket upon engagement of the polygonal opening with the sprin- kler fitting and attachment of the hold-down bracket, the fitting disposing a sprinkler coupled thereto with respect to a finished ceiling surface of a structure, and wherein the first flange and the second flange are both configured to receive and contact the sprinkler fitting.

11. The combination of claim 10, wherein the first and second flanges are spaced apart a predetermined distance to accommodate a portion of the fitting positioned therebetween.

12. The combination of claim 11, wherein a threaded end of the sprinkler is inserted through the circular hole into the fitting to limit vertical motion of the fitting.

13. The combination of claim 12, further comprising a locknut threaded onto the threads of the sprinkler before the sprinkler is threaded to the fitting.

14. The combination of claim 11, wherein the fitting is a CPVC (chlorinated polyvinyl chloride) to NPT (National Piper Tapered Thread) adapter.

15. The combination of claim 14, wherein the adapter is a 1 inch CPVC to ½ inch NPT adapter or a ¾ inch CPVC to ½ inch NPT adapter.

* * * * *